(12) United States Patent
Kang et al.

(10) Patent No.: US 8,526,728 B2
(45) Date of Patent: Sep. 3, 2013

(54) ESTABLISHING CLUSTERS OF USER PREFERENCES FOR IMAGE ENHANCEMENT

(75) Inventors: Sing Bing Kang, Redmond, WA (US); Ashish Kapoor, Redmond, WA (US); Juan Caicedo Rueda, Bogota (CO)

(73) Assignee: Microsoft Corporation, Redmond, WA (US)

(*) Notice: Subject to any disclaimer, the term of this patent is extended or adjusted under 35 U.S.C. 154(b) by 271 days.

(21) Appl. No.: 12/973,922

(22) Filed: Dec. 21, 2010

(65) Prior Publication Data

US 2012/0155759 A1 Jun. 21, 2012

(51) Int. Cl.
*G06K 9/00* (2006.01)

(52) U.S. Cl.
USPC .......................................... 382/167; 382/218

(58) Field of Classification Search
None
See application file for complete search history.

(56) References Cited

U.S. PATENT DOCUMENTS

| | | | |
|---|---|---|---|
| 7,134,091 | B2 | 11/2006 | Dresevic et al. |
| 2002/0019826 | A1 | 2/2002 | Tan |
| 2008/0317358 | A1 | 12/2008 | Bressan et al. |
| 2009/0063537 | A1 | 3/2009 | Bonnefoy-Cudraz et al. |
| 2009/0169073 | A1 | 7/2009 | Areste et al. |
| 2010/0011020 | A1 | 1/2010 | Bouzid et al. |

OTHER PUBLICATIONS

Kang, Sing Bing; Kapoor, Ashish; and Lischinski, Dani, "Personalization of Image Enhancement", Apr. 2010, IEEE, pp. 1799-1806.*
Dale, Kevin; Johnson, Micah K.; Sunkavalli, Kalyan; Matusik, Wojciech; and Pfister, Hanspeter, "Image Restoration using Online Photo Collection", 2009, IEEE International Conference on Computer Vision (ICCV).*
Mountrakis, et al., "Supporting Quality-Based Image Retrieval through User Preference Learning", Retrieved at << http://www.asprs.org/publications/pers/2004journal/august/2004_aug_973-981.pdf >>, Photogrammetric Engineering & Remote Sensing, vol. 70, No. 8,, Aug. 2004, pp. 973-981.
Fogarty, et al., "CueFlik: Interactive Concept Learning in Image Search". Retrieved at << http://www.cs.washington.edu/homes/jfogarty/publications/chi2008-cueflik.pdf >>, Apr. 5-10, 2008, pp. 10.
Gosselin, et al., "Active learning methods for Interactive Image Retrieval", Retrieved at << http://hal.archives-ouvertes.fr/docs/00/52/02/92/PDF/gosselin08ip.pdf >>, 2008, pp. 12.
Goldberg, et al., "Eigentaste: A Constant Time Collaborative Filtering Algorithm", Retrieved at << http://goldberg.berkeley.edu/pubs/eigentaste.pdf >>, Aug. 2000, pp. 11.

(Continued)

*Primary Examiner* — Samir Ahmed
*Assistant Examiner* — Siamak Harandi

(57) ABSTRACT

An image enhancement system may match images to a matrix having various enhancements of images for groups of users. The matrix may define image enhancement settings for the particular images and groups of users, and the matching may apply enhancements to a new image that closely matches a user's preferences. After the matrix is initially populated, new users and new images may be added to increase the matrix's accuracy. The image enhancement system may be deployed as a cloud service, where images may be enhanced as a standalone application or as part of a social network or image sharing website. In some embodiments, the image enhancement system may be deployed on a personal computer or as a component of an image capture device.

20 Claims, 4 Drawing Sheets

(56) References Cited

OTHER PUBLICATIONS

Andreou, et al., "A Collaborative Filtering Approach to Personalized Interactive Entertainment Using Mpeg-21", Retrieved at << http://www.image.ece.ntua.gr/papers/461.pdf >>, 2007, pp. 6.

Kang, et al., "Personalization of Image Enhancement", Retrieved at << http://research.microsoft.com/en-us/um/people/akapoor/papers/personalizedenhancement-cvpr2010.pdf >>, Apr. 2010, pp. 1-8.

\* cited by examiner

ESTABLISHING CLUSTERS OF USER PREFERENCES FOR IMAGE ENHANCEMENT

BACKGROUND

Digital images are being generated at a higher rate than ever. Many people carry cellular telephones with embedded cameras, as well as personal snapshot cameras and digital single lens reflex cameras. The images are being shared in various social networks as well as digital picture frames, websites, and other media.

In many cases, the images are processed using default settings. The default settings for most people using most image capture devices are too complicated and tedious to change, so many people may merely point and shoot, even though the camera may be capable of enhancing the images such that the user may enjoy the images even more.

SUMMARY

An image enhancement system may match images to a matrix having various enhancements of images for groups of users. The matrix may define image enhancement settings for the particular images and groups of users, and the matching may apply enhancements to a new image that closely matches a user's preferences. After the matrix is initially populated, new users and new images may be added to increase the matrix's accuracy. The image enhancement system may be deployed as a cloud service, where images may be enhanced as a standalone application or as part of a social network or image sharing website. In some embodiments, the image enhancement system may be deployed on a personal computer or as a component of an image capture device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
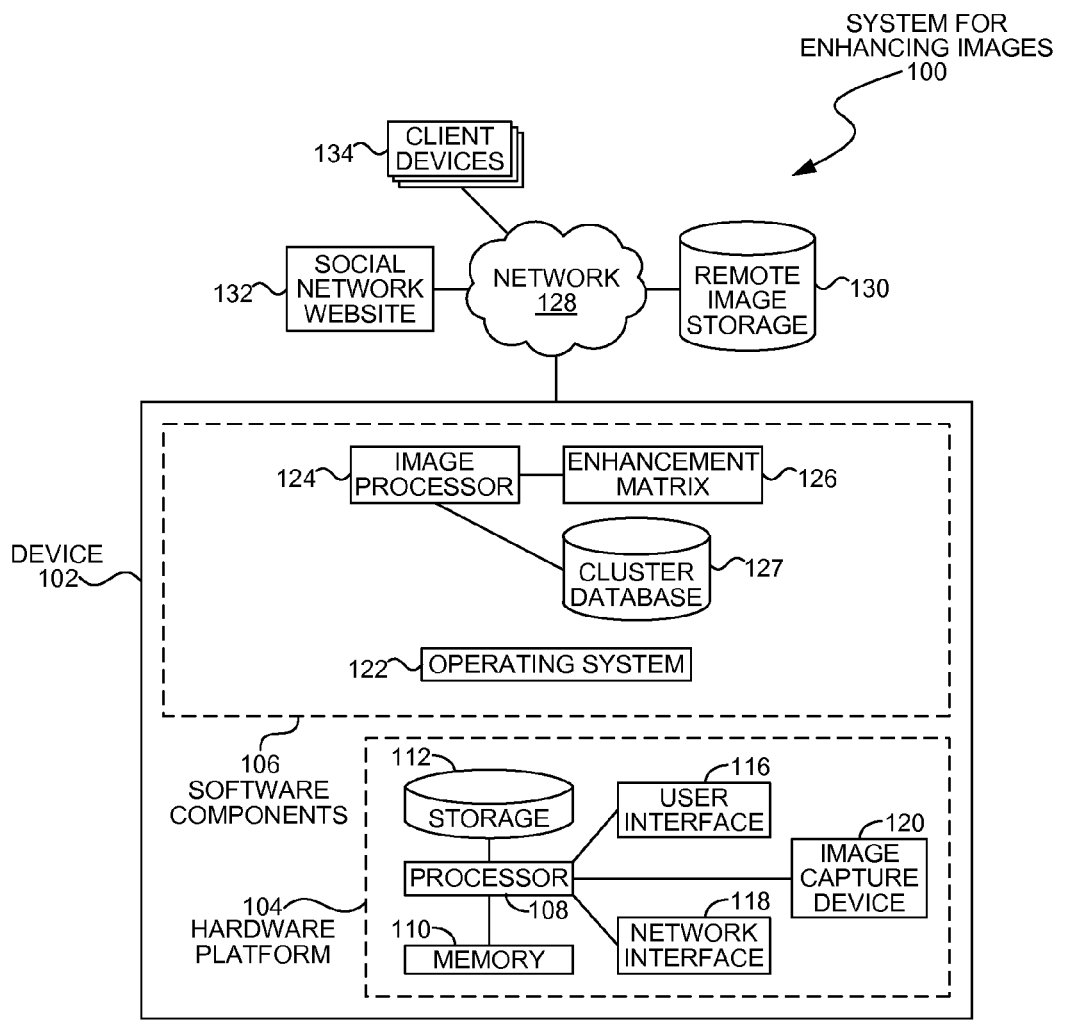
FIG. 1 is a diagram illustration of an embodiment showing a system for enhancing images.

An image enhancement system may find a set of enhancements for an image that correlates to a user's preferences. A matrix of image clusters and user preferences may store specific image settings, and the settings that most align with a user's preferences may be selected for any given image.

User's preferences for how an image is enhanced are often similar to other users. From experiments, there are several clusters of users, each of the clusters being users who prefer a specific set of enhancements to images. The enhancements may be items like color temperature, contrast, tint, brightness, and other enhancements.

For each cluster of users, the enhancements may change with the type of image. For example, low light images may be enhanced in one way while outdoor landscapes may be enhanced in a second way, while portraits may be enhanced in yet a third way.

The image enhancement system may be deployed in many different architectures, from a cloud based system to a version deployed on a user's camera.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may enhance images based on user preferences. Embodiment 100 is a simplified example of a system that may receive images and user information, then select a set of enhancements for an image that most likely correlate with the user's preferences.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 may be a mechanism by which enhancements to images may be applied based on user preferences. People may be grouped based on their specific likes and dislikes, and experiments have shown that there are on the order of three to ten groups of people, each group having similar preferences for how they prefer various images. Some embodiments may have more than ten groups of people. Most of the members of a group may prefer images with a specific set of enhancements such as color saturation, tint, brightness, and other parameters. The specific set of enhancements may vary from one type of image to another.

Embodiment 100 may generate and maintain an enhancement matrix that may have different rows for each group of users and different columns for different images. Each cell of the matrix may include a set of enhancements that may be preferred by members of the user group for the specific type of image.

The system of embodiment 100 may determine a user's preferences by having the user select between several images to show their preferences. Based on the user preferences, the user may be assigned to a specific group.

Some embodiments may collaborative filtering to populate a sparse matrix with the results from other users. The collaborative filtering mechanism may assume that the users may fall into one of several groups, where each of the groups may share the same preferences for enhancements. When users are grouped together, their preferences may be propagated to other members of the group. In this fashion, a relatively large number of users may input preferences for various subsets of a large set of images, yet an enhancement matrix may be fully populated by grouping the results.

In some embodiments, the enhancement matrix may be created by preparing a set of images with different sets of enhancements and recording preferences from several users. In some cases, several hundred users may provide input and may be presented with a handful of images from several tens or even hundreds of images. The data collected may be placed in a sparse matrix that may be populated over time. The user groupings may be determined by a mode-seeking algorithm or other mechanism that may find kernels or groups within the dataset of users.

Over time, the enhancement matrix may be expanded and improved by adding more images and more user preferences to the matrix. In some embodiments, a user may manipulate the enhancements for an image and then upload the enhanced image to the image processor to be added to the enhancement matrix.

The enhancements may be any type of changes or customizations that may be made to the image. In many cases, the images may be created in a raw format and may be enhanced in a secondary operation. In some embodiments, the images may be captured using a camera that may apply some enhancements. In such cases, an enhancement system may apply additional changes after the fact.

An image enhancement system may operate on a device 102. The device 102 is illustrated having hardware components 104 and software components 106. The device 102 as illustrated represents a conventional computing device, although other embodiments may have different configurations, architectures, or components.

In many embodiments, the device 102 may be a server computer. The device 102 may also be a personal computer, desktop computer, or comparable device. In some embodiments, the device 102 may still also be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

An image processor 124 may operate as an application on the device 102. The image processor 124 may receive an image to process, determine a match for the image and a grouping for a user's preferences, and look up the enhancements for that combination in an enhancement matrix 125. In many cases, the image processor 124 may include a cluster database 127 that may contain users as clustered into their groups.

The image processor 124 may have functions for creating, maintaining, and improving the enhancement matrix 126.

When creating the enhancement matrix 126, the image processor 124 may start with a sample set of images. Each image may be processed with a different set of enhancements. Several users may evaluate each of the processed images to select the one version of the image that is preferred over any other version. In many embodiments, the users may evaluate on the order of twenty or thirty images. The user's selections may be evaluated using a mode-seeking or other grouping algorithm to cluster the users together into groups.

The image processor 124 may match images together to find similar images, all of which may receive the same set of enhancements. The image processor 124 may evaluate an image to generate a set of descriptors for the image, and may use the descriptors to compare a new image with images in the enhancement matrix. The descriptors may include, for example, color histograms, textures, edge histograms, color saturation, brightness, or other information. In some cases, the descriptors may include metadata about the images, such as date taken, location, subject matter, tags, or other metadata.

In order to match images together, the image processor 124 may evaluate a new image to determine a set of descriptors, then compare the set of descriptors to the same descriptors for each of the image groups. The new image may be determined to be matched when the image most closely matches another image in the enhancement matrix.

The image processor may be deployed in several different architectures and may be adaptable to different use scenarios. The architectures may include a standalone cloud service, integration into a social network or remote image storing service, as part of a client device, or other architecture.

As a standalone cloud service, the device 102 may be available over a network 128, which may be a local area network, wide area network, the Internet, or other network. Client devices 134 may transmit an image to the device 102, which may perform the image analysis and enhancement, then return an enhanced image.

In such an architecture, the client devices 134 may access the device 102 through a website or other user interface. In another version of such an architecture, the client devices 134 may have an application that may manage images on the client device 134, and that application may transfer the images to the device 102 for processing.

In a social network or other cloud based service, such as a remote image storing service, a user on a client device 134 may upload images to a social network website 132 or remote image storage service 130. When the image is uploaded, the social network website 132 or remote image storage service 130 may transmit the image to the device 102 for enhancement.

In still another embodiment, the image processor 124 may be operable on a user's personal computer that a user connects to a camera. In such an embodiment, the image processor may enhance the images created by the user without having to transmit the images over a network connection.

Some embodiments may use a simplified version of the enhancement matrix 126. For example, an embodiment for use on a personal computer may only use a single row of the enhancement matrix 126 that relates to the group of users to which the user belongs. In such an embodiment, a full version of an enhancement matrix 126 may be maintained and updated by a remote image enhancement service, and a much smaller version of the enhancement matrix 126 may be downloaded and available on the local personal computer.

In some embodiments, the smaller version of the enhancement matrix 126 may be available on a camera or other image capture device. In such an embodiment, the analyses performed on images for matching may be simplified when the image capture device may have less computing resources. In some embodiments, the image analyses may be performed by specialized hardware, such as logic arrays or other circuitry that may be capable of analyzing an image without consuming processing cycles.

Figure 2:
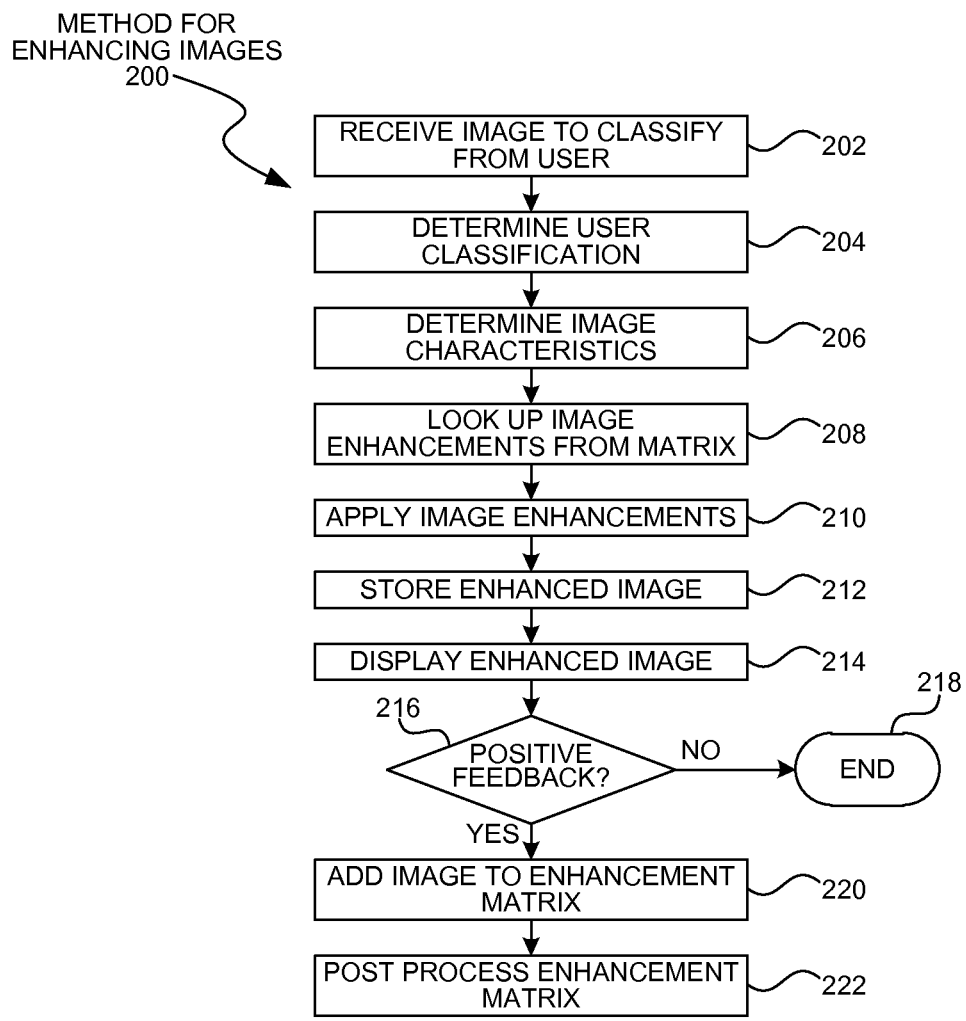
FIG. 2 is a flowchart illustration of an embodiment showing a method for enhancing images.

FIG. 2 is a flowchart illustration of an embodiment 200 showing a method for enhancing images. The process of embodiment 200 is a simplified example of the operations that may be performed to classify an image, select appropriate enhancements, and apply the enhancements.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

An image may be received from a user in block 202. The image may be any type of digital image and the image may have metadata or other accompanying information that may identify the user.

In block 204, the user classification may be determined. In many embodiments, a user may undergo a classification process that may determine to which user group the user belongs. An example process for determining the user group may be found in embodiment 400 presented later in this specification.

In block 206, the image characteristics may be determined. In many embodiments, the image may be analyzed using various image analysis tools to determine color histograms, texture analysis, edge histograms, color saturation, brightness, or other types of image analysis. The analyses may generate a set of image descriptors that may be compared to image descriptors for other images to select a group for the image.

Once the image characteristics and user classification are known, the image enhancements may be retrieved from the enhancement matrix in block 208. The enhancements may be applied in block 210.

In some embodiments, the image characteristics may be a vector containing many variables describing the image. In order to find an appropriate set of enhancements, the image vector may be compared to similar vectors for the images in the enhancement matrix. A match may be determined by finding the closest match between the image vectors. Once a match is found, the corresponding set of enhancements may be retrieved.

In some embodiments, the enhancements may be applied and a new image created. The new image may be stored in block 212 and displayed in block 214.

In other embodiments, the enhancements may be transmitted to the requestor and the requestor may apply the enhancements, store the image, and display the image.

In some embodiments, the image may be added to the enhancement matrix. Some such embodiments may add the image after receiving feedback in block 216. The feedback may be used to prevent the enhancement matrix from being polluted by too many images. If the feedback is negative or not given, the process may end in block 218.

The feedback may be as simple as a button that a user may press indicating that the enhancements are OK. In some embodiments, two or more versions of the image may be presented, each with a different set of enhancements. Based on the user's selection, the set of enhancements and the image may be added to the enhancement matrix.

If the feedback is positive in block 216, the image may be added to the enhancement matrix in bock 220. After adding the image, the enhancement matrix may be post processed in block 222 to add the newly added image's characteristics to that of the other images in the matrix.

In some embodiments, an image may be added to the enhancement matrix when the image is substantially different from any of the previous images in the enhancement matrix. In such an embodiment, the image may be added as a sparsely populated column within the enhancement matrix. Such an embodiment may present the image to users from other groups to determine preferred enhancements for the image to fully populate the column.

Figure 3:
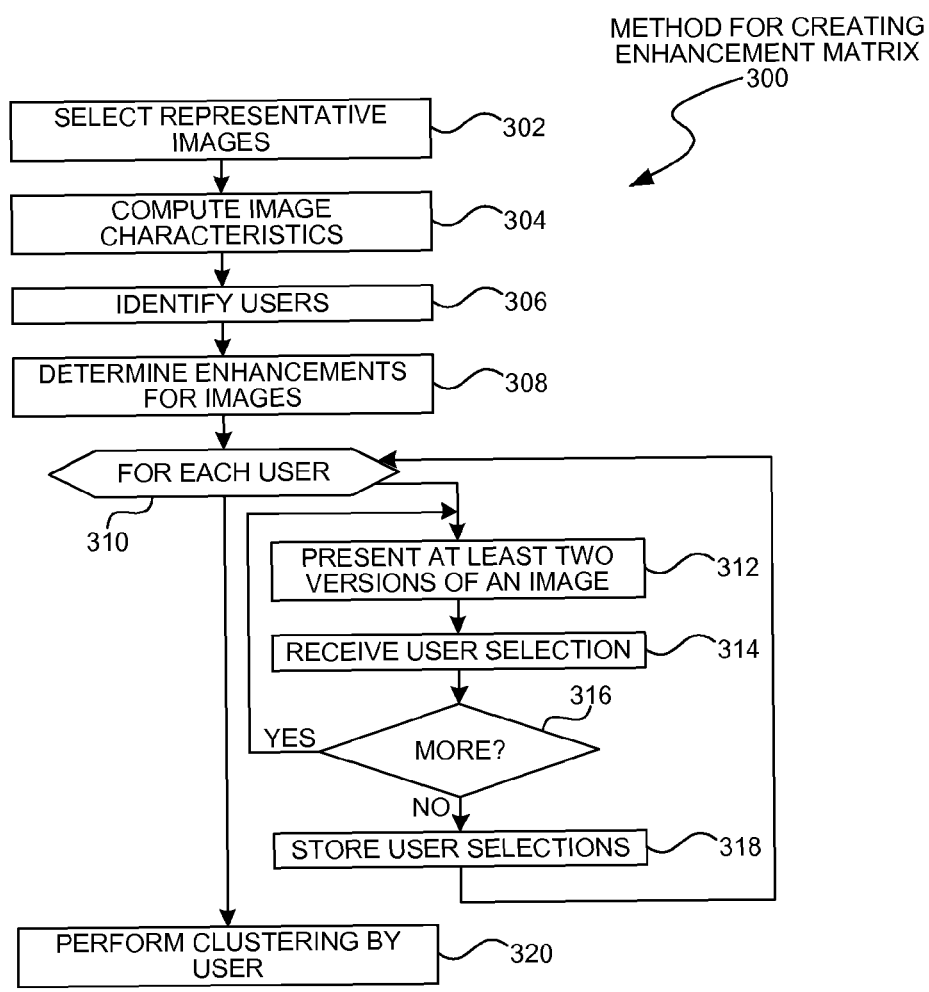
FIG. 3 is a flowchart illustration of an embodiment showing a method for creating an enhancement matrix.

FIG. 3 is a flowchart illustration of an embodiment 300 showing a method for creating an enhancement matrix. The process of embodiment 300 is a simplified example of the operations that may be performed to create an initial enhancement matrix. Once the matrix is created, the matrix may be used as-is or may be expanded over time to include additional images.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates an example of how an enhancement matrix may be created. Once the enhancement matrix is at least somewhat populated, additional images may be added the enhancement matrix over time.

In block 302, representative images may be analyzed in block 304 to identify characteristics of the images. The characteristics may be used to compare new images to those in the enhancement matrix.

The users that may participate in the initial construction of the enhancement matrix may be identified in block 306. In many cases, the users may be identified from a large cross section of the target population. In many embodiments, several hundred users or even thousands of users may be tested.

In block 308, the images may be created with different enhancements. In many cases, a professional photographer or other experienced person may create different versions of each of the images identified in block 302.

For each user in block 310, at least two versions of the same image may be presented to the user in block 312 and the user selection may be received in block 314. The process may loop back in block 316 to block 312 to collect several selections. The user selections may be stored in block 318.

In some embodiments, a single image may be presented with two, three, four, or more versions of the image. In some embodiments, eight or more versions may be presented. The user may view the selections and select one version out of all the versions as their favorite.

In many embodiments, the data collected may be a sparse matrix that may not include each user's selections for each group of images. Such an embodiment may assume that the user grouping may be strong enough that a user's group membership may be able to determine the user's preferences for images for which the user has not evaluated.

After each user has entered their selections, the user selections may be processed in block 320 to perform clustering by user. The clustering may define groups to which the users may belong. One mechanism for clustering may be a mode-seeking algorithm.

Figure 4:
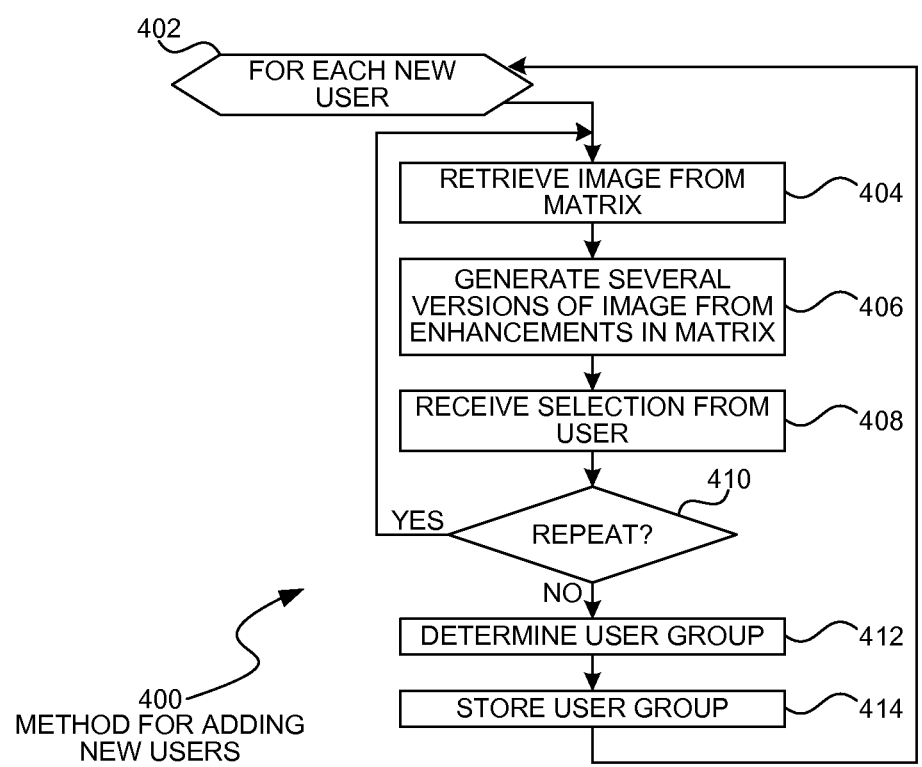
FIG. 4 is a flowchart illustration of an embodiment showing a method for adding new users.

FIG. 4 is a flowchart illustration of an embodiment 400 showing a method for adding new users to an image enhancement system. The process of embodiment 400 is a simplified example of the operations that may be performed to determine which group a particular user may belong.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method by which a user may be presented a subset of images representing different image groups, and the user's selection of preferences for the subset may be used to determine the user's preferences for all types of images.

In another embodiment, a user may be able to enhance one or more images. The user's enhancements of the image may be extracted from the results and compared to other user's enhancements of the same image. The comparison may result in the user being added to one of the user groups.

In contrast, the method of embodiment 400 may present an image that may be enhanced in several different manners, each of which may appeal to one of the user groups. The user may simply select the image that the user likes the most. Based on the user's selection, the user may be added the corresponding group.

In block 402, each new user may be evaluated.

In block 404, an image may be retrieved from the enhancement matrix. In block 406, several versions of the image may be created, each having a different set of enhancements and representing different user groups. The user may view the versions and select a version in block 408. The process may repeat in block 410 to process several images.

Based on the user input, a user group may be defined in block 412 and the user's group may be stored in block 414.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
  receiving a test image associated with a user;
  determining a user classification for said user, wherein the user classification relates the user to a group of users who prefer specific sets of enhancements, the sets of enhancements being associated with respective image types;
  determining a similarity between said test image and an individual image type;
  looking up said user classification and said individual image type in an enhancement matrix to determine a set of enhancements for said test image; and
  applying said set of enhancements to said test image.

2. The method of claim 1, said set of enhancements comprising at least one of a group composed of:
- color temperature;
- tint;
- brightness; and
- contrast enhancement.

3. The method of claim 1, the determining the user classification being determined by a user classification method, comprising:
- obtaining a plurality of images;
- preparing an individual image of the plurality of images, the preparing comprising:
  - determining the respective image type for the individual image, and
  - producing at least two enhanced versions of the individual image, wherein a first enhanced version uses a first set of enhancements associated with the respective user classification of a first user for the respective image type, and a second enhanced version uses a second set of enhancements associated with a different respective user classification for a second user for the respective image type,
- presenting the at least two enhanced versions to the user;
- in response to the presenting, receiving a selection from the user; and
- determining the user classification from the selection.

4. The method of claim 3, wherein the user classification is determined from multiple selections received from the user in response to multiple sets of enhanced versions of images having been presented to the user.

5. The method of claim 1, wherein the user classification is one of a set of user classifications developed by analyzing preferences of multiple different users for types of enhancements to various types of images.

6. The method of claim 1, wherein the determining the similarity comprises:
- analyzing the test image for image characteristics, wherein the image characteristics include at least one of a group composed of color histograms, texture analysis, edge histograms, color saturation, and brightness; and
- based on the image characteristics of the test image, choosing the individual image type that has similar image characteristics.

7. The method of claim 5, wherein the enhancement matrix is populated with data from the set of user classifications and the various types of images.

8. The method of claim 7, wherein the enhancement matrix comprises rows for individual user classifications of the set of user classifications, and columns for individual types of images.

9. A system comprising:
- an enhancement matrix comprising sets of image enhancements for a plurality of images; and
- an image processor that is configured to:
  - receive a first image from a user,
  - receive a group membership for the user,
  - determine a match between a type of said first image and another type of a second image, said second image being in said enhancement matrix,
  - determine an individual set of image enhancements from said enhancement matrix corresponding to said type and said group membership, and
  - apply said individual set of image enhancements to said first image.

10. The system of claim 9, wherein said enhancement matrix comprises rows of user groups.

11. The system of claim 10, wherein said enhancement matrix is updated by adding new data located remotely from said system.

12. The system of claim 9 further comprising:
- an image capture device that generated said first image.

13. The system of claim 9, wherein the sets of image enhancements are organized by user groups.

14. The system of claim 13, wherein the user groups are generated by analyzing selections by multiple users of sets of image enhancements for various types of images, and grouping the multiple users according to similarities in the selections.

15. The system of claim 9, wherein the match is determined by:
- analyzing the first image for image characteristics corresponding to an image type; and
- choosing the second image based on the another type having similar image characteristics to the image type of the first image.

16. The system of claim 9, said enhancement matrix being a sparsely populated matrix.

17. The system of claim 16, wherein the enhancement matrix is expanded by adding more images.

18. A method performed on a computer processor, said method comprising:
- receiving an enhancement matrix comprising a set of image enhancements for a plurality of images and groups of users;
- receiving a test image to classify, said test image being associated with a user;
- determining a user classification for said user, wherein the user classification relates the user to an individual group of the groups of users represented in the enhancement matrix;
- analyzing said test image to determine a set of image characteristics and comparing said set of image characteristics to other image characteristics for said plurality of images in said enhancement matrix;
- looking up said user classification and said set of image characteristics in said enhancement matrix to determine a set of enhancements for said test image; and
- applying said set of enhancements to said test image.

19. The method of claim 18 further comprising:
- matching an image type of said test image to a closest image type in said enhancement matrix based on said set of image characteristics.

20. The method of claim 19 further comprising:
- causing said test image with said enhancements to be displayed to the user.

* * * * *